United States Patent [19]

Paliwal et al.

[11] Patent Number: 5,124,091
[45] Date of Patent: Jun. 23, 1992

[54] PROCESS FOR PRODUCING FINE POWDERS BY HOT SUBSTRATE MICROATOMIZATION

[75] Inventors: Muktesh Paliwal; Robert J. Holland, Sr., both of Sayre, Pa.

[73] Assignee: GTE Products Corporation, Stamford, Conn.

[21] Appl. No.: 704,681

[22] Filed: May 17, 1991

Related U.S. Application Data

[63] Continuation of Ser. No. 518,261, May 7, 1990, abandoned, which is a continuation of Ser. No. 336,198, Apr. 10, 1989, abandoned.

[51] Int. Cl.$^5$ ............................................. B29B 9/02
[52] U.S. Cl. ..................................... 264/15; 65/21.3; 75/342; 164/46; 264/5; 264/500; 425/6
[58] Field of Search ................. 264/5, 8, 10, 12, 15, 264/500, 80; 425/8, 6; 65/21.2, 21.3; 164/418, 460, 424, 46; 219/121.36, 121.37, 121.38; 75/331, 342

[56] References Cited

U.S. PATENT DOCUMENTS

| | | | |
|---|---|---|---|
| 2,699,576 | 1/1955 | Colbry et al. | 264/8 |
| 2,728,107 | 12/1955 | Hershey | 264/8 |
| 4,435,342 | 3/1984 | Wentzell et al. | 264/8 |
| 4,592,781 | 6/1986 | Cheney et al. | 264/8 |
| 4,781,741 | 11/1988 | Johnson et al. | 264/15 |
| 4,816,067 | 3/1989 | Kopatz et al. | 65/21.3 |
| 4,952,144 | 8/1990 | Hansz et al. | 264/15 |
| 5,076,991 | 12/1991 | Poole et al. | 264/500 |

OTHER PUBLICATIONS

H. Hohmann, et al., "Metal Powder Production by Ultrasonic Capillary or Standing Wave Technique (Modern Developments In. Powder Metallurgy" Eds. P. Ulf Gummeson D. A. Gustopson, 1988, vol. 20, pp. 159-167.

*Primary Examiner*—Jeffery Thurlow
*Assistant Examiner*—Mathieu Vargot
*Attorney, Agent, or Firm*—James Theodosopoulos

[57] ABSTRACT

A process for producing fine powder, which includes entraining a starting powder material in a carrier gas, injecting the starting powder material using the carrier gas into a high temperature jet to form a high velocity stream of molten droplets, fragmenting the resulting high velocity molten droplets by impacting against a substrate wherein the temperature of the substrate is above the melting point of the powder material, to form smaller droplets, and allowing the resulting fragmented smaller droplets to spheroidize and solidify in flight.

7 Claims, 1 Drawing Sheet

PROCESS FOR PRODUCING FINE POWDERS BY HOT SUBSTRATE MICROATOMIZATION

This is a continuation of copending application Ser. No. 07/518,261, filed on May 7, 1990, which is a continuation of Ser. No. 07/336,198, filed on Apr. 10, 1989, both now abandoned.

BACKGROUND OF THE INVENTION

This invention relates to a process for producing fine spherical powders by a microatomization process in which the starting material in powder form is melted and simultaneously accelerated to high velocities using a high temperature source such as a plasma jet and thereafter the material is impacted against a substrate which is heated to and maintained at a temperature above the melting point of the powder material.

Atomization is a commercial technique for producing metal powders. Atomization is achieved by directing a high pressure gas or fluid at a stream of molten metal. Resulting powders can be spherical or irregular in shape. Though the throughput rates are high the yield of fine powders (<10 micrometer diameter) is low, typically in the 5–20% range.

Metal powders of various materials, metal, alloys, ceramics, and glasses can be reduced in size by milling. The resulting milled powders are irregular in shape. Contamination of the product can result from the grinding media and the liquid. These irregular powders can be spheroidized using a high temperature source (such as a DC plasma jet), if so desired. This two step process is subject to contamination problems. Melting of the milled particles using a high temperature source such as a DC plasma jet can also cause evaporation of fine powders. Unmelted particles can be included in the classified product.

A method for making fine metal powders, less than about 20 micrometers in size is described by Cheney et al in U.S. Pat. Nos. 4,502,885, 4,592,781, 4,613,371, 4,687,510, and 4,731,517 and by Johnson et al in 4,781,741. The processes relate to entraining powder material in a carrier gas and injecting into a high temperature source such as a DC plasma jet. The molten droplets are fragmented on impacting a substrate and are then resolidified in flight. As taught in the above mentioned patents, the substrate is cold, that is, at temperatures below the melting point of the powder material, and preferably chilled. They suggest also using a substrate that is moving, preferably rotating, to continuously change the substrate area exposed to the impacting particles and plasma gases thus keeping the substrate temperatures low. Use of auxiliary fluids to keep the substrate cold is also suggested. Examples of fine powders made using the process include metals and alloys, glasses and ceramics. The above mentioned process as described in the above mentioned patents will be subsequently referred to as "Cold Substrate Microatomization". Extended operation of this process can be prone to problems. Particles which are unmelted or which have resolidified in flight can deposit on the substrate. The gradual build-up of the uneven rough deposit on the substrate results in gradual decrease in the process efficiency due to decrease in the fragmentation of the impacting droplets.

SUMMARY OF THE INVENTION

In accordance with one aspect of this invention, there is provided a process for producing fine powder, which comprises entraining a starting powder material in a carrier gas, injecting the starting powder material using the carrier gas into a high temperature jet to form a high velocity stream of molten droplets, fragmenting the resulting high velocity molten droplets by impacting against a substrate wherein the temperature of the substrate is above the melting point of the powder material, to form smaller droplets, and allowing the resulting fragmented smaller droplets to spheroidize and solidify in flight.

DETAILED DESCRIPTION OF THE INVENTION

Figure 2:
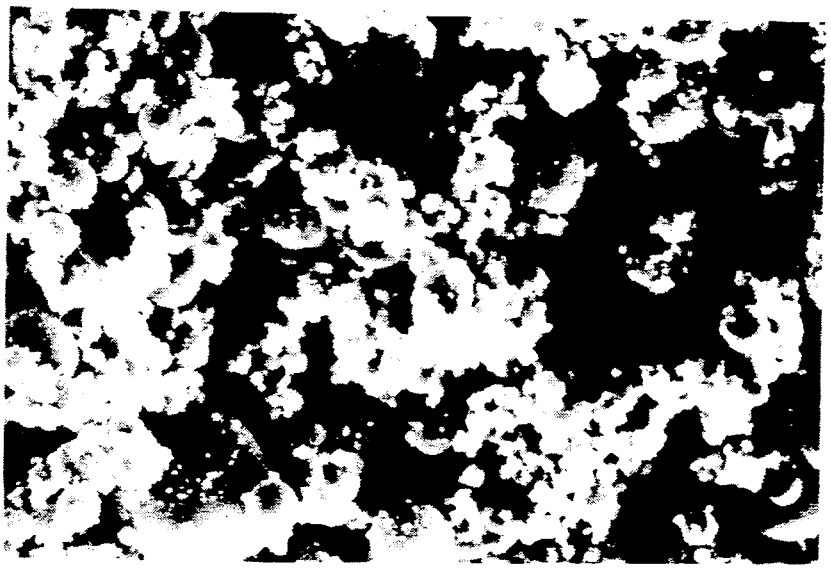
FIG. 2 is a scanning electron micrograph at 2000×magnification of a typical product powder made from the starting powder of FIG. 1.

For a better understanding of the present invention, together with other and further objects, advantages, and capabilities thereof, reference is made to the following disclosure and appended claims in connection with the above described figures and description of some of the aspects of the invention.

The process of this invention is "Hot Substrate Microatomization". The process relates to production of fine powder by impacting a high velocity stream of molten material or droplets onto a hot substrate. The substrate is maintained at a temperature above the melting point of the powder material. Molten droplets of the material are fragmented into smaller droplets on impacting the substrate. These fragmented droplets spheroidize and resolidify within flight. The collected product contains a larger proportion of fine size powders than the original powder. The powder product can be sieved or classified to selected size ranges.

The starting powder material can be essentially any powder that will melt without decomposing. The invention is especially applicable to metal and metal alloy powders, ceramic based powders, and glasses.

The particle size of the starting powder is typically less than about 100 micrometers in diameter. The powders can be irregular in shape.

The starting material is entrained in a carrier gas such as argon and injected into a high temperature jet. The source of the high temperature jet can be a plasma such as a D.C. or RF gun, or a flame spray gun. The preferred source of the high temperature jet is a D.C. plasma gun. Gases used in the plasma guns are selected on the basis of inertness and/or energy content. These gases include but are not limited to Ar, $H_2$, He, $N_2$, and combinations thereof. The D.C. plasma guns are used commercially for coating applications and the details of the plasma guns, associated equipment and their operation are well known.

Plasma gas compositions and flow rate, power levels, nozzle geometry and ambient pressure level combinations can be selected to provide plasma jets with temperature and velocities over a wide range. Plasma gas average temperatures can be varied approximately in the 4000°–17,000° C. temperature range and the plasma jet velocities can be subsonic to supersonic, approximately 200 m/sec to 4,000 m/sec. Supersonic velocities (Ma 2 to Ma 3) are generally achieved by exiting the plasma jet into a chamber at reduced pressure of 20–100 Torr. The powder particle temperature and velocity depend on the plasma gun operating conditions and the thermo-physical properties of the powder material. Particle velocities for 10–100 micrometer size powder are typically in the 50–500 m/sec range.

The high temperature jet simultaneously melts and accelerates the powder particles. The resulting high temperature treated material which is in the form of a high velocity stream of molten droplets is then impacted against a substrate wherein the temperature of the substrate is above the melting point of the powder material. On impacting the substrate, the molten powder particles fragment into smaller droplets and then spheroidize and resolidify within flight. The particle size of the resulting spherical particles is less than the particle size of the starting material. Most typically a large fraction of the resulting spherical particles is less than about 20 micrometers in diameter.

Selection of the substrate material is based on the nature of the powder material itself. Essentially any material which can be heated to elevated temperatures (above the melting point of the powder material) and retains enough strength and erosion resistance in order to withstand continuous impact of the molten droplets over sustained periods of time, can be considered as a suitable substrate. Thus many high temperature materials can be considered. Some potential materials can be metals, metal alloys, oxides, borides, silicides, nitrides, intermetallic compounds, and combinations thereof. Some typical materials from which substrates can be made are molybdenum, tantalum, rhenium, tungsten, aluminum oxide, magnesium oxide and zirconium oxide, hafnium carbide, tantalum carbide, hafnium diboride, tantalum diboride, and titanium diboride, hafnium nitride, tantalum nitride, zirconium nitride, tantalum silicide, zirconium silicide, and tungsten silicide. The substrate material can also be a composite of different materials. The selection of the target material is dependent on the powder material itself. Target materials that alloy or react with the powder material can result in erosion of the substrate and contamination of the processed powder. Thus a target material which does not react or alloy with the powder material or with very slow rates of alloying or reaction should be selected. Other factors that should be considered are thermo-physical properties such as thermal shock resistance, conductivity, specific heat, price, availability, etc.

One combination of powder material and substrate material that is especially suited to the practice of the present invention is copper powder impacted onto a substrate of tungsten-based material, for example thoriated tungsten.

It is essential that the substrate be maintained at a temperature above the melting point of the powder material. This can be done by any means. Though auxiliary means of heating the substrate can be used, the preferred method is to use the DC plasma jet (same as the preferred method of heating and accelerating the powder particles) for heating the substrate also. Depending on the electrical power supply arrangement, a plasma gun can be operated in non-transferred mode, transferred mode or a transferred-nontransferred combination mode. The transferred mode refers to an electrical arrangement in which an electrically conducting target substrate forms a part of the electric circuit itself. In the non-transferred mode of operating, the plasma gun nozzle is used to make the electrical connection, the substrate does not form a part of the electrical circuit and thus can be either electrically conducting or non-conducting. The transferred-nontransferred combination refers to an arrangement in which the plasma gun nozzle as well as the target substrate form parts of the electric circuit. The terms transferred, non-transferred and transferred-nontransferred arc are standard terms, the theory and operation of plasma guns in these various modes are generally known to those that are familiar with welding and/or plasma spraying technology.

All three modes of plasma gun operation can be used for heating the substrate. The preferred methods of plasma gun operation are the 1) non-transferred mode and 2) transferred-nontransferred combination mode. In the non-transferred mode of plasma gun operation, the substrate temperature is controlled by adjusting the combination of parameters: 1) plasma gas composition, 2) plasma gas flow rates, 3) plasma gun power, 4) chamber pressure, and 5) plasma gun to substrate distance. In the transferred-nontransferred combination mode of plasma gun operation, the transferred arc power is the additional parameter which can be adjusted to heat the substrate to desired temperatures. Thus the plasma gun operating parameters are selected to cause melting of the powders as well as heating the substrate to a temperature above the melting point of the powder material. The small fraction of powder particles that are unmelted will tend to deposit on the substrate. These deposited particles are, however, quickly melted (required heat being provided by the substrate as well as the plasma jet) and blown away by the plasma jet. Thus the problems associated with the buildup of a deposit and associated loss in "microatomization" efficiency as in the "Cold Substrate Microatomization" are essentially avoided.

Figure 1:
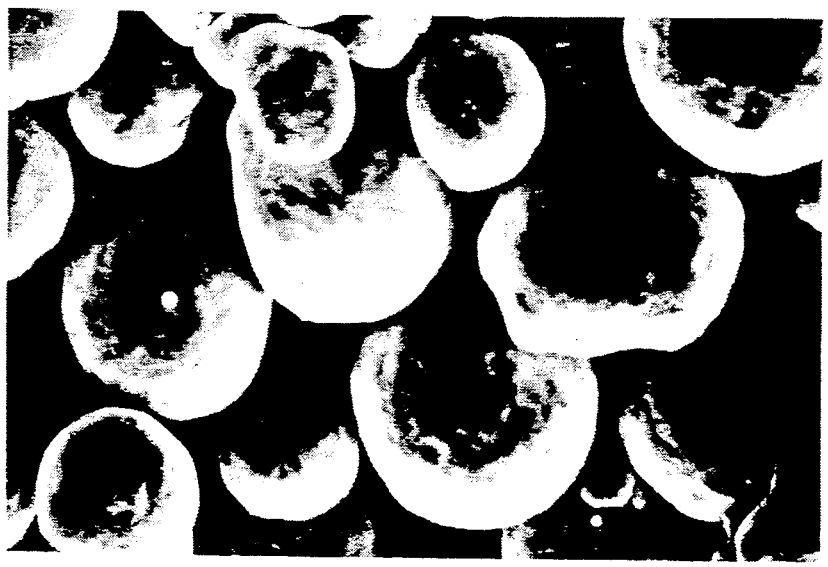
FIG. 1 is a scanning electron micrograph at 2000×magnification showing a typical starting powder of the present invention.

To more fully illustrate this invention, the following non-limiting example is presented. Example Copper powder in the 11–62 micrometer size range, with a mean size of about 28 micrometers is microatomized using a plasma gun with a 10 mm throat diameter. A tungsten disk of about 2% by weight thoria is used as the substrate target material because it can be heated easily to the required temperatures (greater than about 1083° C., which is the melting point of copper) and it does not alloy or react with copper. The plasma gun to substrate distance is about 8 inches. Plasma gas flow rates are Ar, about 160 l/min., $H_2$, about 5 l/min., and He, about 30 l/min. Plasma gun power is approximately 80 kw. The plasma gun is operated in a chamber maintained at reduced pressure of 75 Torr, that is, at approximately 1/10 of atmospheric pressure. After start-up and stabilization of the plasma gun operating conditions, the plasma jet is allowed to heat up the substrate. After the substrate has attained a temperature above the melting point of copper and stabilized, powder is injected into the plasma jet with argon as the carrier gas at about 20 l/min. At the end of the run, the microatomized powder is collected and analyzed for size distribution. Analysis shows that the microatomized powder is in the 0.5–28 micrometer range with means size of about 6 micrometers. In comparison, the starting powder has a mean size of about 28 micrometers. Thus, a substantial reduction in the mean size is achieved using the "Hot Substrate Microatomization" process of the present invention. Scanning electron micrographs showing the size of the starting material and the microatomized product powder are shown in FIGS. 1 and 2 respectively.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing fine powder, said process comprising:
   a) entraining a starting powder material in a carrier gas;
   b) injecting said starting powder material using said carrier gas into a high temperature direct current plasma jet to form a high velocity stream of molten droplets;
   c) fragmenting said high velocity stream of molten droplets by impacting said droplets against a substrate to form smaller droplets wherein the temperature of said substrate is above the melting point of said starting powder material, said temperature being maintained by heating said substrate, said substrate being formed from a tungsten based material; and
   d) allowing the resulting fragmented smaller droplets to spheroidize and solidify in flight.

2. A process of claim 1 wherein said starting powder material is selected from the group consisting of metal powders, metal alloy powders, ceramic based powders, and glasses.

3. A process of claim 1 wherein said substrate is made of material selected from the group consisting of metals, metal alloys, ceramics and combinations thereof.

4. A process of claim 1 wherein said powder is copper and said substrate is a tungsten-based material.

5. A process for producing fine powder, said process comprising:
   a) entraining a starting powder material in a carrier gas;
   b) injecting said starting powder material using said carrier gas into a high temperature direct current plasma jet to form a high velocity stream of molten droplets;
   c) fragmenting said high velocity stream of molten droplets by impacting said droplets against a substrate to form smaller droplets wherein the temperature of said substrate is above the melting point of said starting powder material, said temperature being maintained by heating said substrate including direct heating from said high temperature direct current plasma jet; and
   d) allowing the resulting fragmented smaller droplets to spheroidize and solidify in flight.

6. The process of claim 5 wherein the particle size of said starting powder material is less than about 100 micrometers in diameter.

7. The process of claim 5 wherein the particle size of the fine powder produced by the process is less than about 20 micrometers in diameter.

* * * * *